No. 735,902. Patented August 11, 1903.

UNITED STATES PATENT OFFICE.

CARL V. PETRAEUS, OF IOLA, KANSAS.

METHOD OF TREATING ZINC ORES.

SPECIFICATION forming part of Letters Patent No. 735,902, dated August 11, 1903.

Application filed November 19, 1901. Serial No. 82,863. (No specimens.)

*To all whom it may concern:*

Be it known that I, CARL V. PETRAEUS, a citizen of the United States of America, residing in Iola, in the county of Allen, in the State of Kansas, have invented a certain new and Improved Method of Treating Zinc Ores, of which the following is a true and exact description.

My invention relates to the treatment of zinc ores, and has for its object the extraction of the metallic contents of such ores with great completeness and economy, partly in the form of metallic zinc and partly in the form of metallic fumes, largely consisting of oxid of zinc and suitable for use as a pigment.

My treatment consists in first subjecting the zinc ores in admixture with carbonaceous material to the ordinary treatment for producing metallic zinc or "spelter"—that is to say, such a mixture is heated in muffles or retorts with exclusion of air to approximately a white heat in order to smelt and volatilize the larger portion of the zinc, such volatilized zinc being recovered by condensation in the usual manner. The second stage of my treatment consists in taking the residue left in the retorts or muffles and which has heretofore been of very little commercial value and treating the metal-bearing portion of said residue in admixture with carbon, which may be either the residual coke left in the retorts or fresh coal mixed with the metal-bearing portion of the residue after the coke has been separated for other uses in a compound reducing and oxidizing furnace, preferably of the well-known Wetherill furnace type, in order to oxidize and volatilize in the form of a fume the zinc and any lead contained in the residue. I then screen the furnace-gases in order to recover the metallic fume, which is in the form of a grayish powder, and this powder I further treat by subjecting it to a temperature indicated by a dull-red heat in order to whiten it and adapt it for use as a pigment.

I would mention that in the treatment of the furnace residue for the production of metallic fume the attainment of the necessary high temperature can be facilitated and the use of solid carbonaceous matter diminished by blowing into the furnace not only air, but a reducing carbonaceous gas.

Having now described my invention, what I claim as new, and desire to secure by Letters Patent, is—

1. The method of treating zinc ores for the economic utilization of their metallic contents, which consists, in mixing said ores with carbon, subjecting the mixture to high heat with exclusion of air to smelt and volatilize the greater portion of the zinc, recovering the volatilized zinc by condensation, subjecting the unvolatilized residue, consisting of coke and ore, to heat in an oxidizing atmosphere to oxidize the zinc, and any lead therein, and drive them off as a fume, recovering said fume by screening the furnace-gases, and finally subjecting the recovered fume to a temperature indicated by a red heat, to whiten it.

2. The method of treating zinc ores for the economical utilization of their metallic contents, which consists in mixing said ores with carbon, subjecting the mixture to high heat with exclusion of air to smelt and volatilize the greater portion of the zinc, recovering the volatilized zinc by condensation, subjecting the unvolatilized metallic residue in admixture with carbonaceous material, to heat in an oxidizing atmosphere to oxidize the zinc, and any lead therein, and drive them off as a fume, recovering said fume by screening the furnace-gases, and finally subjecting the recovered fume to a temperature indicated by a red heat, to whiten it.

CARL V. PETRAEUS.

Witnesses:
EDWD. C. REGU,
D. STEWART.